(12) United States Patent
Taylor et al.

(10) Patent No.: US 10,859,184 B2
(45) Date of Patent: Dec. 8, 2020

(54) INDICATOR DISC FOR DETERMINING THE POSITION OF BALL VALVE

(71) Applicant: Conval, Inc., Enfield, CT (US)

(72) Inventors: Paul W. Taylor, Norwich, CT (US); Michael T. Glavin, Sterling, MA (US)

(73) Assignee: Conval, Inc., Enfield, CT (US)

( * ) Notice: Subject to any disclaimer, the term of this patent is extended or adjusted under 35 U.S.C. 154(b) by 128 days.

(21) Appl. No.: 15/962,092

(22) Filed: Apr. 25, 2018

(65) Prior Publication Data

US 2019/0331254 A1 Oct. 31, 2019

(51) Int. Cl.
*F16K 37/00* (2006.01)

(52) U.S. Cl.
CPC ...... *F16K 37/0008* (2013.01); *F16K 37/0016* (2013.01)

(58) Field of Classification Search
CPC ..... F16K 37/0008; F16K 37/0016; F16K 5/06
USPC ........................................................ 137/556
See application file for complete search history.

(56) References Cited

U.S. PATENT DOCUMENTS

| 467,796 | A | | 1/1892 | Ferrell | |
|---|---|---|---|---|---|
| 659,794 | A | * | 10/1900 | Doble | F16K 5/222 137/246.13 |
| 692,391 | A | | 2/1902 | Wagner | |
| 1,103,917 | A | | 7/1914 | Lawson | |
| 1,174,915 | A | | 3/1916 | Walsh | |
| 2,367,651 | A | * | 1/1945 | Stone | F16K 37/0008 116/277 |
| 2,485,942 | A | | 10/1949 | Turner | |
| 2,607,557 | A | | 8/1952 | Allen | |
| 2,930,344 | A | | 3/1960 | Brasel | |
| 3,089,505 | A | | 5/1963 | Forster | |
| 3,339,884 | A | | 9/1967 | Smith et al. | |
| 3,475,006 | A | | 10/1969 | Sargent | |
| 3,482,596 | A | | 12/1969 | Jones | |
| 3,534,773 | A | * | 10/1970 | Dewberry | F16K 37/0016 137/553 |
| 3,701,362 | A | | 10/1972 | Reese | |
| 4,046,350 | A | * | 9/1977 | Massey | F16K 31/1635 251/58 |
| 4,593,717 | A | * | 6/1986 | Levasseur | F16K 11/085 137/556.6 |
| 4,606,374 | A | | 8/1986 | Kolenc et al. | |
| 5,799,928 | A | | 9/1998 | Siver | |

(Continued)

OTHER PUBLICATIONS

International Search Report including Written Opinion for Application No. PCT/US19/28845, dated Aug. 6, 2019, pp. 1-17.

(Continued)

*Primary Examiner* — Umashankar Venkatesan
(74) *Attorney, Agent, or Firm* — Lerner, David, Littenberg, Krumholz & Mentlik, LLP

(57) ABSTRACT

A disc for indicating a position of a ball valve is provided herein. The disc includes a body having an outer circumferential edge and an inner circumferential edge. The inner circumferential edge defines an aperture configured to receive a valve stem. The disc further includes a first indicia and a second indicia circumferentially spaced about the outer edge of the body and circumferentially from one another. When connected to the ball valve, the first indicia is configured to indicate that the ball valve is in an open position and the second indicia is configured to indicate that the ball valve is in a closed position.

7 Claims, 5 Drawing Sheets

(56) References Cited

U.S. PATENT DOCUMENTS

| | | | |
|---|---|---|---|
| 5,806,559 A * | 9/1998 | Takasaka | F16K 37/0008 |
| | | | 137/556 |
| 5,890,450 A | 4/1999 | Hamell et al. | |
| 6,019,129 A * | 2/2000 | Taha | F16K 35/022 |
| | | | 137/553 |
| 6,029,692 A | 2/2000 | Barber | |
| 6,112,619 A * | 9/2000 | Campbell | F16K 31/60 |
| | | | 116/277 |
| 6,655,316 B2 | 12/2003 | Kerger et al. | |
| 7,267,323 B1 | 9/2007 | O'Callaghan | |
| 8,162,001 B2 | 4/2012 | Yang | |
| 8,365,766 B2 | 2/2013 | Wang | |
| 8,800,597 B2 | 8/2014 | Colby et al. | |
| 8,820,707 B2 | 9/2014 | Chang | |
| 9,022,065 B1 | 5/2015 | Kliewer et al. | |
| 9,212,762 B2 | 12/2015 | Duncan | |
| 9,500,287 B2 | 11/2016 | Duncan | |
| 9,695,945 B2 | 7/2017 | Colby et al. | |
| 9,790,075 B2 | 10/2017 | Menolotto et al. | |
| 2003/0024466 A1 | 2/2003 | Brazell | |
| 2004/0031944 A1 | 2/2004 | Schommer | |
| 2005/0127317 A1 | 6/2005 | Rebello | |
| 2010/0308246 A1 * | 12/2010 | Witkowski | F16K 5/0442 |
| | | | 251/249.5 |
| 2013/0299727 A1 | 11/2013 | Witkowski et al. | |
| 2014/0076418 A1 | 3/2014 | Ibsen et al. | |
| 2015/0075652 A1 | 3/2015 | Bell | |
| 2015/0144208 A1 | 5/2015 | Caccavo et al. | |
| 2016/0290528 A1 | 10/2016 | Emanuel et al. | |

OTHER PUBLICATIONS

TK Hi-Integrity Trunnion Mounted Ball Valve, Manual [Online], Dec. 2017, pp. 1-24, Cameron Valves & Measurement, <URL:https://www.products.slb.com/-/media/cam/resources/2014/10/08/17/54/tk-high-integrity-trunnion-mounted-ball-valve-iom.ashx>.

Valves and Actuators Product Selection Guide, Brochure [Online], Jun. 2017, pp. 1-24, Petrol Valves, <URL:https:/www.petrolvalves.com/upload/product-pdf/PRODUCT%20SELECTION%20GUIDE.pdf>.

* cited by examiner

INDICATOR DISC FOR DETERMINING THE POSITION OF BALL VALVE

BACKGROUND OF THE INVENTION

The present invention relates to devices for determining the position of a valve, and more particularly, an indicator disc for determining the position of a high-pressure ball valve.

BACKGROUND OF THE INVENTION

Process piping manifolds having multiple valves for directing media to various destinations are widely used, for example, in power generation plants, chemical plants, petrochemical plants, textile industries, rubber plants, and selected process industries. In some applications, process systems are highly automated and are operated by sophisticated computer control systems. In other applications, because of cost, safety, and/or reliability considerations, some or all of the valves are designed for manual or hand operation.

In the manual operation, an operator must set the position of a plurality of valves correctly so that media flows to the proper end user or apparatus. Processes using these hand-operated manifolds typically are batch processes requiring a number of cyclically repeated steps, each of which requires a different set of valve positions. In severe applications, such as steam, where positive, sustainable shutoff is critical, even slight misalignments will compromise sealing such that operating error can cause significant economic losses and may even result in serious safety hazards. Therefore, careful attention to valve position during critical initial valve setup operating steps is extremely important.

Various types of position indicators for high pressure valves are widely available to indicate whether the valve is in the open or closed position. Many of these indicators are integrated with electric or pneumatic drive mechanisms and display the valve position by means of electrical or mechanical readout mechanisms which are integral parts of the valves.

In certain applications in which an operator requires valve position information, it is desirable to have simple position indicators that are not electrically or mechanically driven. It is also desirable to have position indicators that can be easily installed on and removed from standard valves not originally designed or manufactured with position indicators. Among other advantages, the present invention provides a simple valve position indicator that can be used with the particular ball valve system described hereinafter, or alternatively, attached to a valve stem of a standard ball valve, or any other quarter-turn valve with critical position requirements, to serve as an improved visual indicator.

SUMMARY OF THE INVENTION

In accordance with a first aspect of the present invention, a disc for indicating a position of a ball valve is provided. The disc may be integrally provided with a ball valve assembly, for example, the ball valve assembly provided herein; or alternatively, the disc may be attached to a valve stem of a known ball valve.

In one embodiment, the indicator disc includes a body having an outer circumferential edge and an inner circumferential edge. The inner circumferential edge defines an aperture extending through the body. The aperture is configured to receive a valve stem connected to a ball. A first indicia and a second indicia are provided at least adjacent the outer circumferential edge of the body with the second indicia being circumferentially spaced from the first indicia. The first indicia may be circumferentially spaced from the second indicia, for example, by 90 degrees. The body may have at least one arcuate cut-out provided about the outer circumferential edge adjacent to the first and/or second indicia.

The first indicia is preferably visually distinguishable from the second indicia such that when the disc is coupled to a valve stem, the first indicia is configured to indicate that the valve is in an open position and the second indicia is configured to indicate that the valve is in a closed position. The first indicia may, for example, include a circle and the second indicia may include an "X".

At least one of the first indicia and the second indicia may also include a match line extending from the outer circumferential edge of the disc body toward a longitudinal axis of the indicator disc.

In a preferred embodiment, the disc also includes a third indicia configured to indicate that the valve is in the open position and a fourth indicia configured to indicate that the valve is in the closed position. The third indicia is circumferentially spaced 180 degrees from the first indicia and the fourth indicia is circumferentially spaced 180 degrees from the second indicia.

A ball valve assembly is also described herein. The ball valve assembly includes a bonnet provided with a scribe line adapted to be seated within a ball valve body, a valve stem being at least partially disposed within the bonnet and adapted to be connected to a ball, and an indicator disc. The indicator disc having a first indicia and a second indicia provided adjacent an outer edge of the indicator disc. The first indicia being circumferentially spaced from the second indicia such that when the first indicia is angularly aligned with the scribe line of the bonnet, the ball valve is in an open position, and when the second indicia is angularly aligned with the scribe line of the bonnet, the valve is in a closed position.

The indicator disc has a generally disc shaped body having a closed outer circumferential edge and a closed inner circumferential edge. The inner circumferential edge may be sized and shaped to receive the valve stem. In one particular embodiment, the inner circumferential edge is configured to secure the indicator disc to the valve stem via a friction fit. To improve the friction fit, the indicator disc may include a raised shelf at least partially circumscribing the inner circumferential edge. The raised shelf may additionally have a threaded bore extending therethrough, for receiving a fastening element, to supplement the securement of the indicator disc to the valve stem.

The bonnet may define a recess within which the indicator disc sits and a recessed window intersecting the indicator disc recess. The scribe line is preferably provided within the recessed window.

Another embodiment of the ball valve assembly is also provided herein. The ball valve assembly of this embodiment includes a bonnet assembly adapted to be seated within a ball valve body and an indicator disc. The ball valve assembly includes a valve stem adapted to be connected to a ball and a scribe line. The indicator disc at least partially encircles the valve stem and is rotatable therewith. The indicator disc includes a first indicia and a second indicia circumferentially spaced from one another and radially spaced a distance apart from a portion of the indicator disc engaged with the valve stem. When the first indicia is angularly aligned with the scribe line, the ball valve is in the open position, and when the second indicia is angularly aligned with the scribe line, the ball valve is in the closed position.

The indicator disc preferably also includes a third indicia and a fourth indicia. When the third indicia is angularly aligned with the scribe line, the ball valve is the open position, and when the fourth indicia is angularly aligned with the scribe line, the ball valve is in the closed position. The second and fourth indicia are each spaced 90 degrees from the first and third indicia.

In a preferred embodiment, the first and third indicia include a first marking and the second and fourth indicia include a second marking, which is distinguishable from the first marking.

BRIEF DESCRIPTION OF THE DRAWINGS

Various Embodiments of a Bonnet Assembly and Indicator Disc are Disclosed Herein, with Reference to the Drawings, in which.

DETAILED DESCRIPTION

As used herein, "axial" means along or parallel to a longitudinal axis of the ball valve stem and "radial" means in a perpendicular direction thereto. "Rotation" refers to rotation about the longitudinal axis, unless otherwise described. "Interior" or "inner" means radially inward, either toward or facing the longitudinal axis, and "exterior" or "outer" means radially outward, or away from the longitudinal axis. "Angular" or "angularly" refers to an objects angular position relative to the scribe line.

Figure 1:
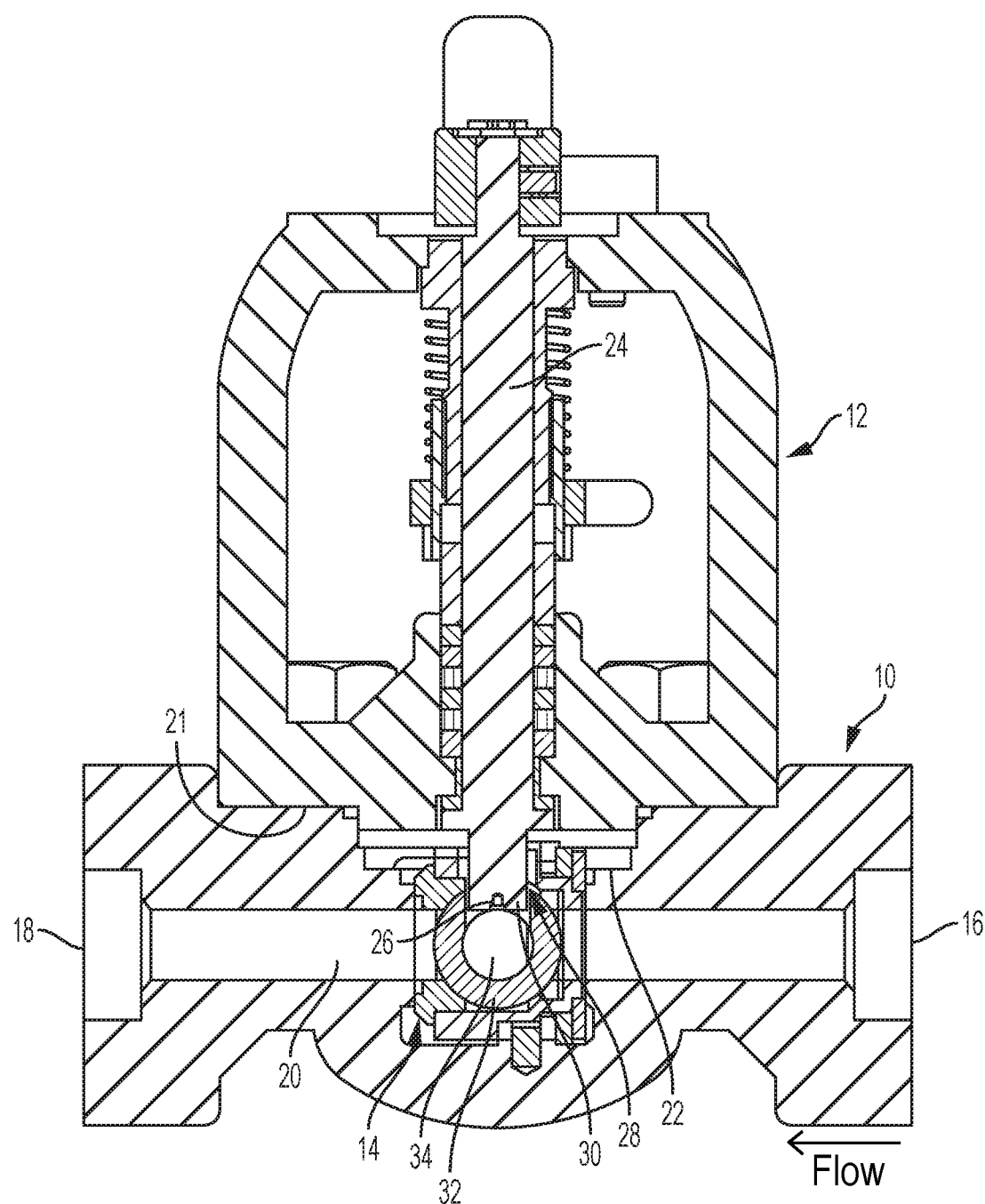
FIG. 1 is a cross-section view of a typical ball valve.

FIG. 1 illustrates a typical ball valve, as described in U.S. Pat. No. 7,267,323, assigned to Applicant and incorporated herein by reference in its entirety, to which an indicator disc of the present invention may be secured. The ball valve generally includes a body 10, a bonnet assembly 12, and a cartridge assembly 14. Valve body 10 has an inlet 16, an outlet 18, and a flow passage 20 extending therebetween. Flow passage 20 may be a straight passage, as shown in FIG. 1, or may be curved, for example, in an inverted U-shaped configuration, as taught by U.S. Pat. No. 5,799,928, also assigned to Applicant and incorporated herein by reference in its entirety.

Valve body 10 defines an access opening 21 having a recess 22 thereabout in which bonnet assembly 12 is seated. Bonnet assembly 12 includes a valve stem 24 having an extension 26 at its lower end that extends into slot 28 and engages with ball 32, such that rotation of valve stem 24 rotates the ball 32. Ball 32 defines a flow passage 34 that intermittingly aligns with flow passage 20 of body 10 as ball 32 is rotated to permit fluid flow in an open configuration (i.e., when flow passage 34 is aligned with flow passage 20) and to block fluid flow in a closed configuration (i.e., when flow passage 34 is perpendicular to flow passage 20). Ball 32 may desirably have a wear resistant coating.

Figure 2:
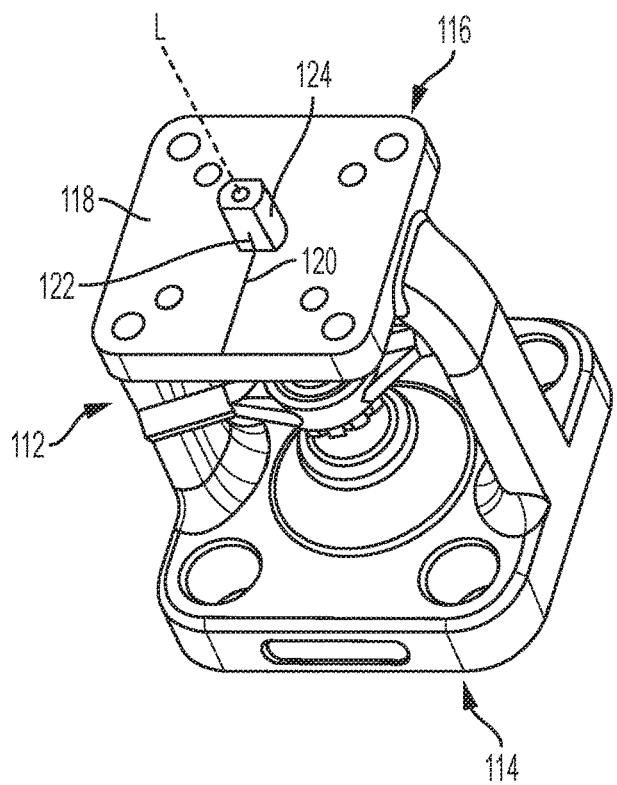
FIG. 2 is a perspective view of a known bonnet assembly having an indicator mechanism.

FIG. 2 illustrates a known bonnet assembly 112, which is substantially similar to bonnet assembly 12, except for the addition of a visual indicator as described below. Bonnet assembly 112 includes a first or lower end 114 for engaging recess 22 of body 10 (shown in FIG. 1) and a second or top end 116 provided opposite the lower end 114. Top end 116 has a substantially flat upper surface 118 upon which a scribe line 120 is provided. Scribe line 120 is accurately formed during manufacture of bonnet 112 and precisely aligned perpendicular to the flow passageway 20 of body 10 (shown FIG. 1). Bonnet assembly 112 includes a valve stem 124 having an extension at its lower end that extends into slot 30 and engages with ball 32 such that rotation of valve stem 124 rotates the ball 32.

A vertical match line 122 is provided on a portion of valve stem 124 such that vertical match line 122 extends parallel to a longitudinal axis L of valve stem 124 and perpendicular to flow passage 34 of ball 32. As valve stem 124 rotates, along with ball 32, vertical match line 122 rotates angularly relative to scribe line 120. When scribe line 120 and match line 122 are aligned (as shown in FIG. 2), a visual indication is provided to the user that the valve is in the closed position.

Figure 3:
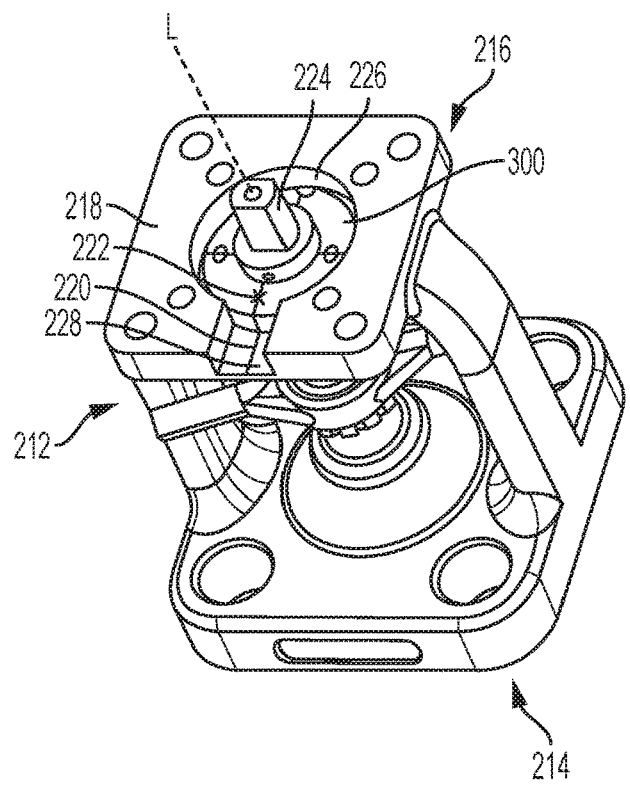
FIG. 3 is a perspective view of a bonnet assembly and an indicator disc according to an embodiment of the present invention.

FIG. 3 illustrates a bonnet assembly 212 according to an embodiment of the present invention. Bonnet assembly 212 is adapted to receive a disc 300 for precisely indicating whether a valve is in the open or closed position. Bonnet assembly 212 includes a first or lower end 214 for engaging recess 22 of body 10 (shown in FIG. 1) and a second or top end 216 provided opposite the lower end 214. Like bonnet assembly 12, and bonnet assembly 112, bonnet assembly 212 includes a valve stem 224 having an extension at its lower end for extending into slot 30 and engaging with ball 32, such that rotation of valve stem 224 rotates ball 32.

A recess 226 for receiving indicator disc 300 is defined in an otherwise substantially flat upper surface 218 of the second end 216 of bonnet assembly 212. As shown in FIG. 3, recess 226 is circular in shape to correspond to indicator disc 300. However, it will be understood that recess 226 may be any shape that allows indicator disc 300 to sit therein.

Upper surface 218 may further include a recessed viewing window 228 extending from an outer perimeter of the upper surface 218 toward valve stem 224 such that viewing window 228 intersects indicator recess 226. A scribe line 220 is preferably formed in or on an exposed surface provided within viewing window 228. Scribe line 220 is formed during manufacture of bonnet assembly 212 and precisely aligned perpendicular to the flow passageway 20 of body 10 (shown FIG. 1). The scribe line 220 may be a solid line, a dashed line, or include a plurality of dots, either provided on the exposed surface or cut into the surface so long as it accurately indicates alignment of flow passageway 20. As will be explained in further detail hereinafter, bonnet assembly 212 may be used in conjunction with indicator disc 300 for indicating, with greater precision, whether the valve is in the open or closed position.

Figure 4:
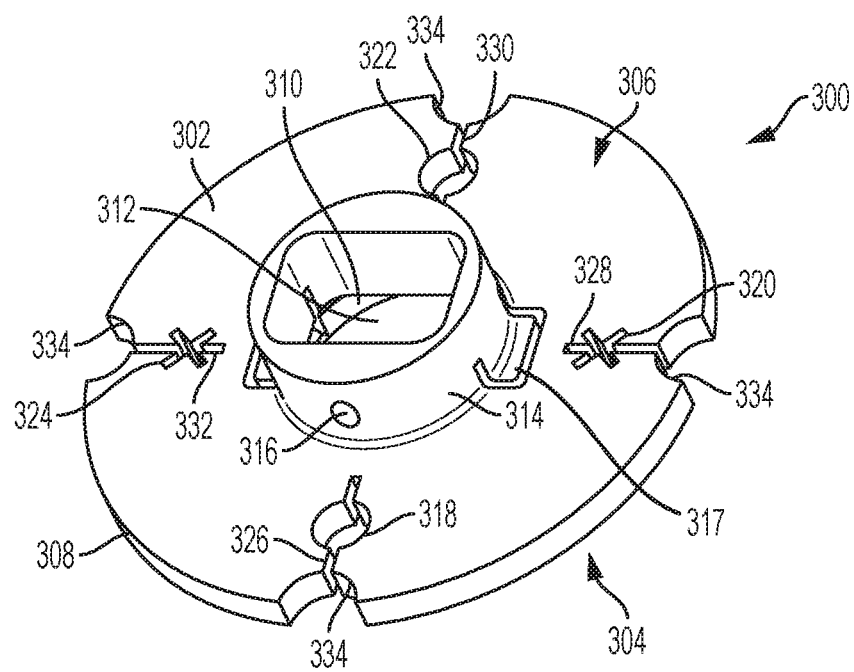
FIG. 4 is a perspective view of the indicator disc of FIG. 3.
Figure 5:
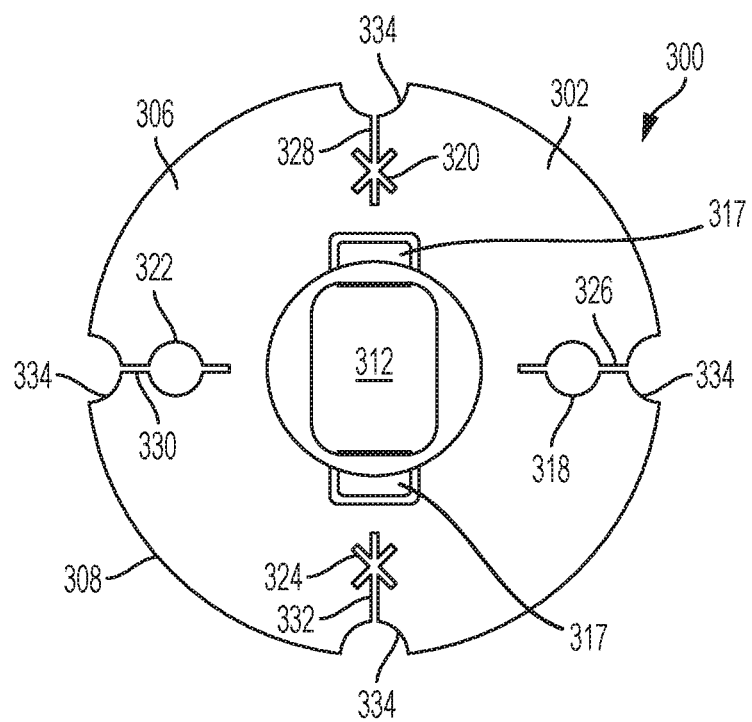
FIG. 5 is a top plan view of the indicator disc of FIG. 3.

FIGS. 4 and 5 illustrate an indictor disc 300 according to an embodiment of the present invention. Indicator disc 300 has a generally disc shaped body 302 having a first or bottom surface 304, an opposing second or top surface 306, a closed outer circumferential edge 308, and a closed inner circumferential edge 310. Inner circumferential edge 310 defines an aperture 312 extending through body 302. Aperture 312 is configured to receive valve stem 224 and facilitate simple securement of indicator disc 300 to valve assembly 212 as indicator disc 300 may be slid over valve stem 224 to sit within indicator recess 226 (shown in FIG. 3). In a preferred embodiment, aperture 312 is correspondingly shaped to the cross-sectional shape of valve stem 224, and may be, for example, generally rectangular with rounded corners, such that indicator disc 300 may be self-secured to valve stem 224, via a friction fit, without the need for costly set screws. Additionally or alternatively, indicator disc 300 may include flexible snap grooves 317 for receiving a protrusion provided on bonnet assembly 212 such that the indicator disc may be snap-fit to the bonnet assembly.

Body 302 may include a raised shelf 314 protruding upwardly from top surface 306 and at least partially circumscribing aperture 312. The raised shelf 314 increases the surface area of inner circumferential edge 310 that contacts valve stem 224, thereby improving the self-secured fit between the components. Additionally, a threaded bore 316 for receiving a set screw may extend through raised portion 312 for securing the indicator disc 300 to valve stem 224. It should be understood, for the reasons above, that this feature is not necessary, but may optionally be provided for supplementing attachment of indicator disc 300 to valve stem 224.

As shown in FIGS. 4 and 5, indicator disc 300 includes a first indicia 318, second indicia 320, third indicia 322, and fourth indicia 324, circumferentially arranged about indicator disc 300. Each of the first indicia 318, second indicia 320, third indicia 322, and fourth indicia 324 are spaced 90 degrees from one another. The first indicia 318 and the third indicia 322 are configured to indicate that the valve is in the open position and the second indicia 320 and the forth indicia 324 are configured to indicate that the valve is in the closed position. Each of indicia 318, 320, 322, 324 may be provided on top surface 306 of indicator disc 300 or be cut through the body 302 of the disc 300 as shown in FIGS. 4 and 5.

The first indicia 318 and the third indicia 322 may, for example, include circles or be a particular color, such as green, thus indicating that the valve is in the open position. The third indicia 320 and the fourth indicia 324 may, for example, include an "X" or be a different color, such as red, to indicate that the valve is in the closed position. It should be understood that the first indicia 318 and the third indicia 322 may take any form different than the second indicia 320 and the fourth indicia 324. The above described embodiments should not be construed as limiting. Any alternative indicia to those described herein, for example, numbers, symbols, shapes, and colors, or a combination thereof, may be substituted without departing from the scope of the invention so long as the indicia indicating that the valve is in the open position can be readily differentiated from the indicia indicated that the valve is in the closed position.

First indicia 318, second indicia 320, third indicia 322, and fourth indicia 324 preferably each include a corresponding match line 326, 328, 330, 332. Each of match lines 326, 328, 330, 322 may be provided on or be cut through the outer surface of disc 300 such as top surface 306 and/or a side surface provided between bottom surface 304 and top surface 306. Match lines 326, 328, 330, 322 may be a single solid line, a plurality of smaller dashed lines, or a plurality of dots forming a larger line. In a preferred embodiment, match lines 326, 328, 330, 322 extend from outer circumferential edge 308 of disc body 302 toward a longitudinal axis of disc 300. As valve stem 224 rotates, each of the match lines 326, 328, 330, 332 angularly rotate relative to scribe line 220, as is shown in FIG. 3. When scribe line 220 and match line 326 or match line 330 are aligned, a visual indication is provided to the user that the valve is in the open position; and when scribe line 220 and match line 328 or match line 332 are aligned, a visual indication is provided to the user that the valve is in the closed position.

A plurality of cutouts 334 may be provided about outer circumferential edge 308 such that cutout is angularly aligned with each of the first indicia 318, second indicia 320, third indicia 322, and fourth indicia 324. Cutouts 334 may be any shape including, but not limited to, triangular, rectangular, or arcuate. As shown in FIGS. 4 and 5, arcuate cutouts draw a user's focus toward an apex of the arc where match lines 326, 328, 330, 332 are provided. Accordingly, cutouts 334 aid a user in making a determination of whether scribe line 220 and match lines 326, 328, 330, 332 are precisely aligned, and thus, provide a more user friendly visual indicator.

Figure 6:
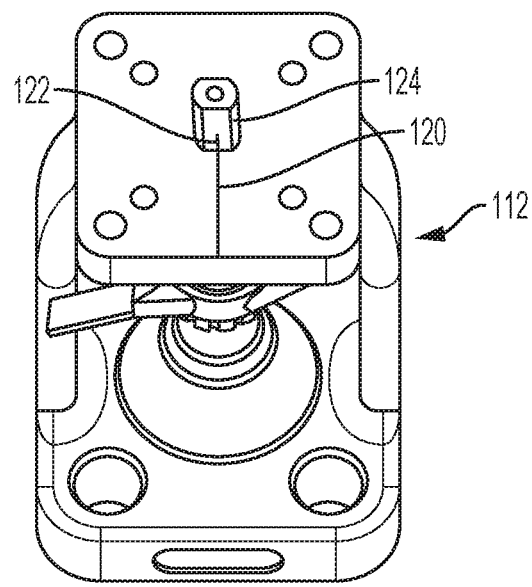
FIG. 6 is a topwardly directed perspective view of FIG. 2 illustrating a slight misalignment of the bonnet assembly.
Figure 7:
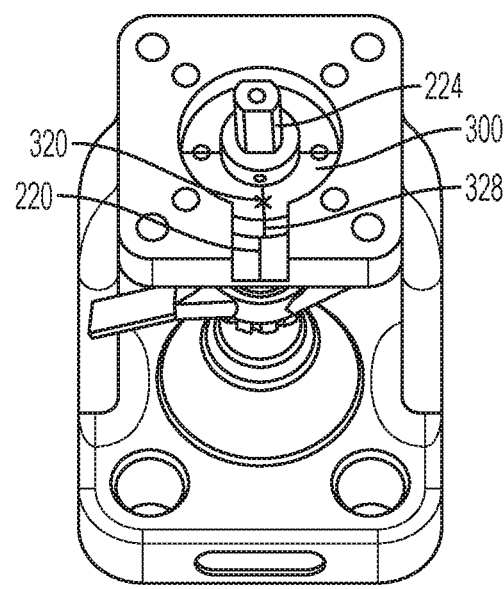
FIG. 7 is a topwardly directed perspective view of FIG. 3 illustrating a slight misalignment of the bonnet assembly.

As is described in greater detail below, with reference to FIGS. 6 and 7, indictor disc 300 provides the user with a more precise visual indication of whether the valve is in the open or closed position. FIG. 6 is a perspective view of known bonnet assembly 112 (shown in FIG. 2) including match line 122. FIG. 7 is a perspective view of bonnet assembly 212 (shown in FIG. 3) and indicator disc 300 (shown in FIGS. 4 and 5).

Referring to FIG. 6, valve stem 124 is positioned such that match line 122 is slightly angularly offset from scribe line 120, for example, by 1 degree. Similarly, with reference to FIG. 7, valve stem 224 is positioned such that match line 328 of second indicia 320 is slightly angularly offset from scribe line 220, for example, by 1 degree. Accordingly, neither the valve of bonnet assembly 112 nor the valve of bonnet assembly 212 are completely closed. As previously explained, in severe applications, for example, steam manifolds, even slight misalignments will compromise proper sealing, which in turn can damage the valve and cause significant economic losses and potentially even result in safety hazards.

In comparing FIGS. 6 and 7, it is evident that slight misalignments are more readily apparent to a user utilizing indicator disc 300 (FIG. 7) and not discernable to a user utilizing the indicator of bonnet assembly 112 (FIG. 6). More particularly, when match line 122 is provided on valve stem 124, as is the case in FIG. 6, the angular offset between match line 122 and scribe line 120 is not readily apparent, whereas, when match line 328 is radially offset from valve stem 224, as is the case in FIG. 7, slight misalignments are discernable to the naked eye. This is because arc length (i.e., the distance along the curved line making up the arc) increases as the radius of the arc increases (assuming equal angular offsets).

Figure 8:
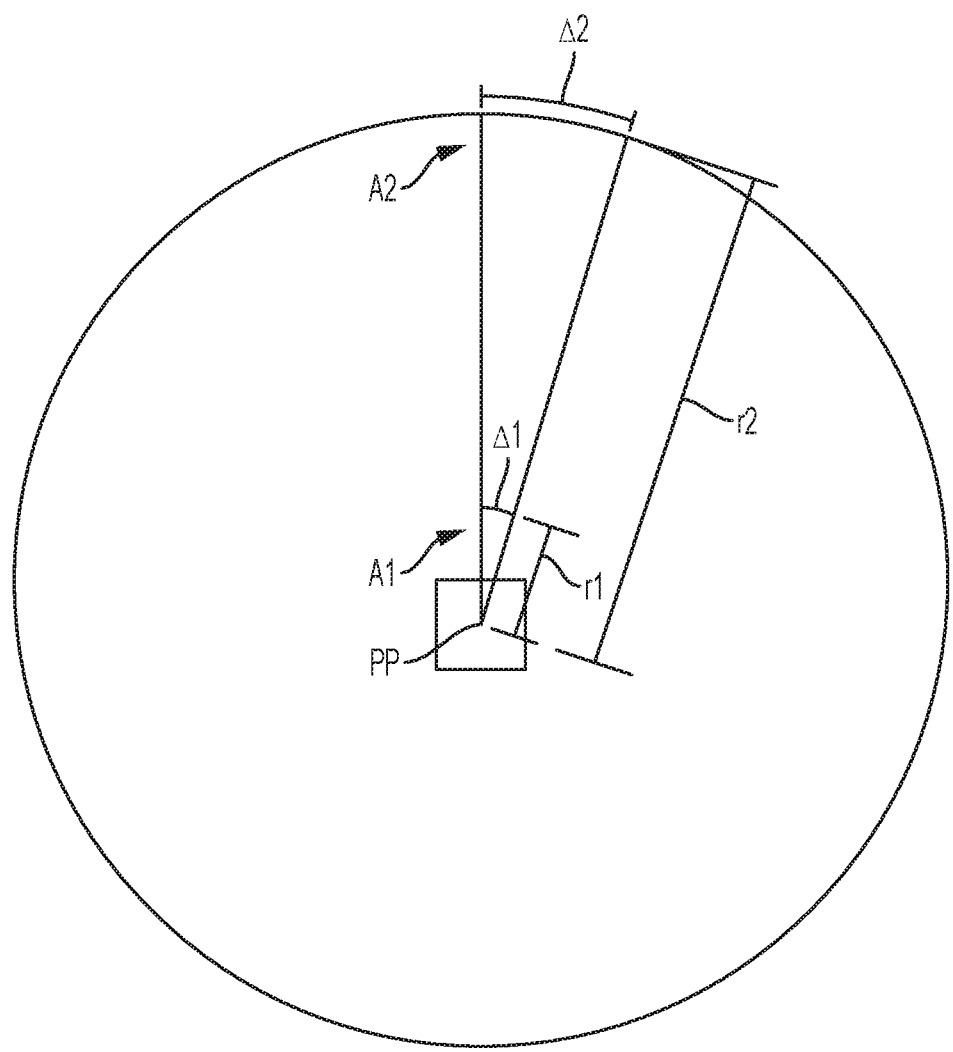
FIG. 8 is a schematic drawings depicting the relationship between arc radius and arc length.

FIG. 8 schematically illustrates this principle. FIG. 8 depicts a first arc A1 having a first radius r1 (i.e., radial offset from pivot point PP) and a second arc A2 having a second radius r2 (i.e., radial offset from pivot point PP). The second radius r2 is greater than the first radius r1. Although the first arc A1 and the second arc A2 have equal angular offsets, relative to the scribe line, the second arc length L2 is greater than the first arc length L. The greater the arc length, the more discernible the misalignment.

Since the first indicia 318, second indicia 320, third indicia 322, and fourth indicia 324, and their corresponding match lines 326, 328, 330, 332, are radially offset from inner circumferential edge 310, and thus, valve stem 224, even a slight misalignment of the indicator disc 300 will be readily apparent to the user. In contrast thereto, referring back to FIG. 6, match line 120 is provided on stem valve 120 (i.e., is not radially offset from valve stem 124), and thus, has a smaller arch length such that slight misalignments are less discernible to the user. Accordingly, indicator disc 300, may be used in conjunction with bonnet assembly 212, previously described, or slid over and secured to a valve stem of a typical ball valve to indicate, with improved precision, whether the valve is in the open or closed position.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A ball valve assembly, comprising:
a bonnet assembly adapted to be seated within a ball valve body, the bonnet assembly having a scribe line and a recess;
a valve stem adapted to be connected to a ball, the valve stem being at least partially disposed within the bonnet assembly; and
an indicator disc disposed within the recess of the bonnet assembly and coupled to the valve stem so as to be rotatable therewith, the indicator disc comprising a first indicia and a second indicia adjacent an outer circumferential edge of the indicator disc, the first indicia being circumferentially spaced from the second indicia, wherein when the first indicia is angularly aligned with the scribe line of the bonnet assembly, the ball valve is in an open position, and when the second indicia is angularly aligned with the scribe line of the bonnet assembly, the ball valve is in a closed position.

2. The ball valve assembly of claim 1, wherein the indicator disc further comprises an inner circumferential edge, and wherein the outer circumferential edge and the inner circumferential edge are each closed.

3. The ball valve assembly of claim 2, wherein the inner circumferential edge is sized and shaped to receive the valve stem.

4. The ball valve assembly of claim 3, wherein the inner circumferential edge is configured to secure the indicator disc to the valve stem via a self-secured fit.

5. The ball valve assembly of claim 2, wherein the indicator disc comprises a raised shelf at least partially circumscribing the inner circumferential edge, the raised shelf having a threaded bore extending therethrough for receiving a fastener.

6. The ball valve assembly of claim 1, wherein the bonnet assembly further defines a recessed window intersecting with the recess.

7. The ball valve assembly of claim 6, wherein the scribe line is provided within the recessed window.

* * * * *